United States Patent
Mullins et al.

(10) Patent No.: US 11,030,390 B2
(45) Date of Patent: Jun. 8, 2021

(54) SHARING CONTENT BETWEEN ELECTRONIC DOCUMENTS

(71) Applicant: Microsoft Technology Licensing, LLC, Redmond, WA (US)

(72) Inventors: Christopher Lee Mullins, Sammamish, WA (US); Jonathan Edgar Fay, Woodinville, WA (US); Joshua Allen Cowhig, Redmond, WA (US); Robert Earl Standefer, III, Duvall, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1007 days.

(21) Appl. No.: 14/992,858

(22) Filed: Jan. 11, 2016

(65) Prior Publication Data
US 2017/0199657 A1 Jul. 13, 2017

(51) Int. Cl.
*G06F 3/00* (2006.01)
*G06F 40/131* (2020.01)
*G06F 3/0484* (2013.01)
*G06F 3/0482* (2013.01)
*G06F 40/166* (2020.01)
(Continued)

(52) U.S. Cl.
CPC .......... *G06F 40/131* (2020.01); *G06F 3/0482* (2013.01); *G06F 3/04842* (2013.01); *G06F 3/04847* (2013.01); *G06F 40/106* (2020.01); *G06F 40/166* (2020.01); *G06F 40/197* (2020.01); *G06Q 2220/127* (2013.01); *G06Q 2220/16* (2013.01); *G06Q 2220/18* (2013.01)

(58) Field of Classification Search
CPC ............... G06F 3/04847; G06F 3/0482; G06F 17/2229; G06F 40/131; G06F 40/166; G06F 40/197; G06F 3/04842; G06F 40/106; G06Q 2220/16; G06Q 2220/127; G06Q 2220/18; G06Q 220/16
See application file for complete search history.

(56) References Cited

U.S. PATENT DOCUMENTS 6,681,369 B2 * 1/2004 Meunier ............... G06F 16/957
715/255
7,369,279 B2 5/2008 Van Oosterhout
(Continued)

FOREIGN PATENT DOCUMENTS

CN 102077198 A 5/2011
CN 104750739 A 7/2015
(Continued)

OTHER PUBLICATIONS

"Online Document Collaboration," Published on: May 20, 2012, Available at http://www.hyperoffice.com/document-collaboration-solution/.
(Continued)

*Primary Examiner* — Jennifer E Nichols
(74) *Attorney, Agent, or Firm* — Michael Best & Friedrich LLP

(57) ABSTRACT

A facility for managing an electronic document is described. The facility receives from a user input selecting a portion of the document, as well as input designating the selected document portion as being subject to approval-gated sharing. The facility persistently stores an indication that the selected document portion is subject to approval-gated sharing.

11 Claims, 12 Drawing Sheets

(51) Int. Cl.
*G06F 40/197* (2020.01)
*G06F 40/106* (2020.01)

(56) References Cited

U.S. PATENT DOCUMENTS

| | | | | |
|---|---|---|---|---|
| 7,617,450 B2* | 11/2009 | Jones | G06F 40/14 | 715/255 |
| 7,818,678 B2* | 10/2010 | Massand | H04L 67/10 | 715/751 |
| 7,882,565 B2* | 2/2011 | Collins | G06F 21/6209 | 726/27 |
| 7,937,663 B2* | 5/2011 | Parker | H04L 65/403 | 715/751 |
| 7,953,696 B2 | 5/2011 | Davis et al. | | |
| 8,054,496 B1* | 11/2011 | Rehfeld | G06F 40/106 | 358/1.18 |
| 8,069,411 B2* | 11/2011 | Titemore | G06F 40/131 | 715/255 |
| 8,090,776 B2 | 1/2012 | Torres et al. | | |
| 8,121,998 B2* | 2/2012 | Razdow | G06F 40/169 | 707/706 |
| 8,126,882 B2* | 2/2012 | Lawyer | G06F 16/23 | 707/723 |
| 8,417,666 B2* | 4/2013 | Bailor | G06F 17/24 | 707/608 |
| 8,504,653 B1 | 8/2013 | Commons et al. | | |
| 8,682,989 B2 | 3/2014 | Meisels et al. | | |
| 9,015,803 B1 | 4/2015 | Chaganti et al. | | |
| 9,118,462 B2* | 8/2015 | Khambete | H04L 9/0822 | |
| 9,256,341 B2* | 2/2016 | Megiddo | G06F 3/048 | |
| 9,355,075 B2* | 5/2016 | Ennis | G06F 40/106 | |
| 9,400,770 B2* | 7/2016 | Ennis | G06F 40/166 | |
| 9,418,054 B2* | 8/2016 | Shaver | G06F 40/166 | |
| 9,613,340 B2* | 4/2017 | Safa | G06F 16/93 | |
| 9,690,785 B1* | 6/2017 | Vagell | G06F 16/93 | |
| 10,467,336 B2* | 11/2019 | Romney | G06F 40/106 | |
| 10,552,796 B1 | 2/2020 | Delacourt | G06Q 10/06 | |
| 2003/0009423 A1 | 1/2003 | Wang | H04L 63/10 | 705/51 |
| 2003/0050919 A1* | 3/2003 | Brown | G06F 21/6218 | |
| 2004/0003352 A1* | 1/2004 | Bargeron | G06F 16/9535 | 715/230 |
| 2004/0267552 A1* | 12/2004 | Gilliam | G06F 21/10 | 705/59 |
| 2005/0011947 A1* | 1/2005 | Reddy | H04L 63/12 | 235/380 |
| 2006/0184867 A1* | 8/2006 | Shpigel | G06F 40/197 | 715/206 |
| 2007/0038567 A1* | 2/2007 | Allaire | H04N 21/812 | 705/50 |
| 2007/0038931 A1* | 2/2007 | Allaire | G06Q 30/0239 | 715/206 |
| 2007/0156694 A1* | 7/2007 | Lim | G06F 21/6218 | |
| 2007/0156745 A1* | 7/2007 | Harrington | G06F 40/131 | |
| 2007/0271502 A1* | 11/2007 | Bedi | G06F 40/186 | 715/230 |
| 2008/0016169 A1* | 1/2008 | Kaghazian | G06F 3/01 | 709/206 |
| 2008/0059539 A1* | 3/2008 | Chin | G06Q 10/10 | |
| 2008/0104118 A1* | 5/2008 | Pulfer | G06F 16/986 | |
| 2009/0157608 A1* | 6/2009 | Strathearn | G06F 16/40 | |
| 2009/0307604 A1* | 12/2009 | Giles | G06F 21/604 | 715/751 |
| 2009/0327294 A1* | 12/2009 | Bailor | G06F 21/6227 | |
| 2010/0017701 A1 | 1/2010 | Bargeron et al. | | |
| 2010/0042690 A1* | 2/2010 | Wall | H04L 51/046 | 709/206 |
| 2010/0229246 A1* | 9/2010 | Warrington | G06F 21/6218 | 726/28 |
| 2011/0078165 A1* | 3/2011 | Battle | G06F 40/131 | 707/756 |
| 2011/0078552 A1* | 3/2011 | Lumley | G06F 40/131 | 715/234 |
| 2011/0161425 A1* | 6/2011 | Xiao | G06F 16/2358 | 709/206 |
| 2011/0231322 A1* | 9/2011 | Meyer | G06F 21/10 | 705/310 |
| 2012/0137202 A1* | 5/2012 | Nelson | G06F 16/9566 | 715/205 |
| 2012/0284290 A1* | 11/2012 | Keebler | G06F 16/958 | 707/756 |
| 2012/0284344 A1* | 11/2012 | Costenaro | G06F 40/197 | 709/206 |
| 2012/0284345 A1* | 11/2012 | Costenaro | G06Q 10/107 | 709/206 |
| 2013/0185252 A1* | 7/2013 | Palmucci | G06F 40/197 | 707/608 |
| 2013/0326330 A1* | 12/2013 | Harris | G06F 40/166 | 715/234 |
| 2013/0339331 A1* | 12/2013 | Patel | G06F 16/93 | 707/705 |
| 2014/0059217 A1* | 2/2014 | Pizurica | H04L 43/08 | 709/224 |
| 2014/0208391 A1* | 7/2014 | Farnsworth | H04L 63/104 | 726/4 |
| 2014/0250058 A1 | 9/2014 | Thiruvidan et al. | | |
| 2014/0281870 A1* | 9/2014 | Vogel | G06F 40/18 | 715/220 |
| 2014/0281895 A1* | 9/2014 | Tay | G06F 40/106 | 715/234 |
| 2015/0199319 A1 | 7/2015 | Newman et al. | | |
| 2016/0117489 A1* | 4/2016 | Furuichi | G06F 21/105 | 726/1 |
| 2016/0378725 A1* | 12/2016 | Marchsreiter | G06F 40/131 | 715/255 |

FOREIGN PATENT DOCUMENTS

| | | |
|---|---|---|
| CN | 104980452 A | 10/2015 |
| WO | 2013181198 A2 | 12/2013 |

OTHER PUBLICATIONS

"Google Docs Help Forum," Published on: Dec. 1, 2009, Available at: https://productforums.google.com/forum/#!topic/docs/mR-UpfGZu_ I.

"File Collaboration," Published on: Nov. 4, 2013, Available at: https://www.egnyte.com/file-sharing/file-collaboration.html.

Paul, Ian, "One year later, Microsoft Offices collaboration tools are still a work in progress," Published on: Mar. 3, 2014, Available at: http://www.pcworld.com/article/2105861/one-year-later-microsoft-offices-collaboration-tools-are-still-a-work-in-progress.html.

Iorio, et al., "From XML Inclusions to XML Transclusions", In Proceedings of the 20th ACM conference on Hypertext and hypermedia, Jun. 29, 2009, pp. 147-156.

Jones, Harvey C., "XHTML Documents with Inline, Policy-Aware Provenance", A Dissertation Submitted for the fulfillment of the Degree of Master of Engineering in Computer Science and Engineering, Massachusetts Institute of Technology, May 2007, pp. 1-68.

Krottmaier, Harald, "Transcluded Documents: Advantages of Reusing Document Fragment", In Proceedings of the 6th International ICCC/IFIP Conference on Electronic Publishing, Nov. 6, 2002, pp. 359-367.

Krottmaier, et al., "Transclusions in the 21st Century", In Journal of Universal Computer Science, vol. 7, No. 12, Dec. 28, 2001, pp. 1125-1136.

Ni, et al., "An Access Control Language for a General Provenance Model", In Proceedings of the 6th VLDB Workshop on Secure Data Management, Aug. 28, 2009, pp. 68-88.

"International Search Report and Written Opinion Issued in PCT Application No. PCT/US2016/068630", dated Jun. 29, 2017, 18 Pages.

"Office Action Issued in European Patent Application No. 16828856. 1", dated May 18, 2020, 6 Pages.

(56) References Cited

OTHER PUBLICATIONS

"First Office Action and Search Report Issued in Chinese Patent Application No. 201680073056.7", dated Dec. 30, 2020, 16 Pages.

* cited by examiner

SHARING CONTENT BETWEEN ELECTRONIC DOCUMENTS

BACKGROUND

Electronic documents generated, updated, and presented using computer systems and other electronic devices can include content of a variety of types such as text, images, and spreadsheets.

As part of the process of conventionally generating an electronic document, it is common to create the document's content, and/or insert content copied from another source, such as a portion of another document. Content that is copied into a document from another source typically exists in the document independently of the source, failing to reflect any subsequent changes that the content undergoes in the source.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for managing an electronic document is described. The facility receives from a user input selecting a portion of the document, as well as input designating the selected document portion as being subject to approval-gated sharing. The facility persistently stores an indication that the selected document portion is subject to approval-gated sharing.

DETAILED DESCRIPTION

Figure 1:
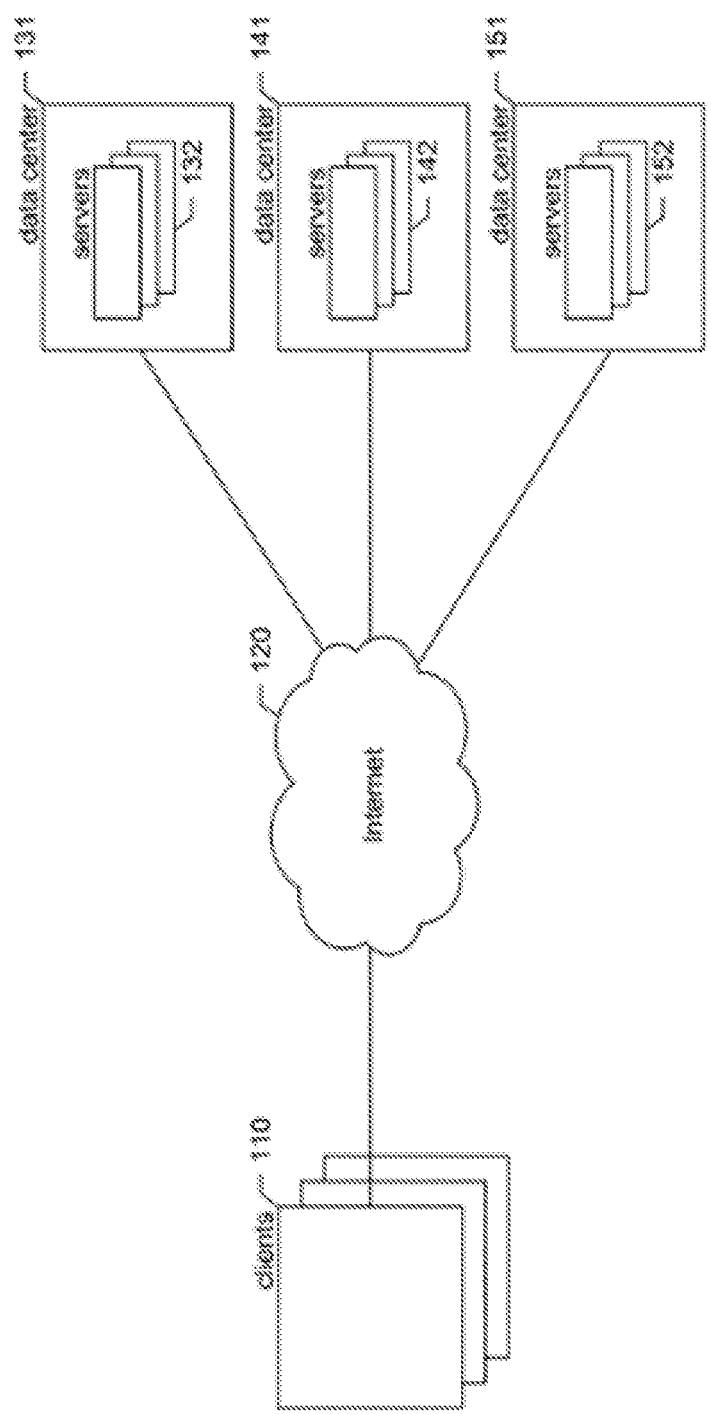
FIG. 1 is a network diagram showing the environment in which the facility operates in some embodiments.

The inventors have recognized significant disadvantages in conventional approaches to incorporating pre-existing content into an electronic document. In particular, the inventors have recognized that such conventional approaches tend to dissociate content incorporated into a document from its source, as well as from other documents into which it is incorporated. Also, the inventors have noted that conventional approaches give authors little control over who can reuse their content, and in what ways.

Accordingly, the inventors have conceived and reduced to practice a software and/or hardware facility that enables the user to share content between any number of documents in any of a variety of modes ("the facility").

A user can incorporate pre-existing content into a target document by, for example, selecting that content within the source document, then performing interactions for transferring the selected content to a particular position in the target document. In various embodiments, such interactions can be, for example, placing the selected content on the clipboard, then pasting it into the target document at the target position; dragging the selected content from the source document to the target position in the target document; etc. In response, rather than copying the selected content from the source document to the target document, at the target position in the target document the facility establishes an incorporation link to the selected content in the source document.

In some embodiments, the author or another owner of a document can selectively choose portions of a document that are available for sharing, i.e., available for incorporation into other documents. In some embodiments, as part of doing so, the owner can specify whether sharing of particular portions is "approval-gated"—that is, whether another author needs approval on behalf of the owner to incorporate any part of such portions into another document. In various embodiments, the owner can specify that s/he must perform the approval personally; can delegate approval decisions to others; can specify criteria according to which approval is automatically given, etc.

In some embodiments, when an author seeks to incorporate a portion of a source document into a target document, the facility prompts the incorporating author to specify an incorporation mode for the incorporation. This incorporation mode typically specifies (a) whether revisions to the incorporated portion that are made in the context of documents other than the target document, such as revisions made in the context of the source document, are available to apply to the version of the incorporated portion that appears in the target document, and (b) whether such application should be automatic, or should be the subject of notifications to the author of the target document and approval by the author of the target document.

In some embodiments, where an incorporation is subject to approval-gating, the facility causes a visual indication that the incorporation is provisional to be shown in the target document while sharing approval is pending. Once sharing is approved, the facility removes this visual indication.

In some embodiments, when an author seeks to make an incorporation that is subject to approval-gating, the facility sends a notification message to the owner of the source document. In some embodiments, the notification message to the owner of the source document identifies the author seeking to make the incorporation and the source and target documents, and includes a quotation of the portion to be incorporated in the context of the target document. The owner of the source document can interact with the notification in order to approve or deny the sharing request.

When a document is revised, the facility determines whether the revisions affect any portions of the document that have been incorporated into other documents. If so, the facility applies the revisions within those target documents in accordance with the incorporation modes selected by the authors of the target documents, subject to notification and approval by those authors if the selected incorporation modes so specify.

In some embodiments, the facility supports the construction of "compound documents" that collect data from multiple sources and become a document in their own right.

In some embodiments, the facility permits transitive sharing or "re-sharing," in which certain content is shared from a first user to a second user, and then from the second user to a third user. In some embodiments, the facility enables an original author of content to specify whether the content is eligible for re-sharing, and/or establish conditions that must be satisfied in order for the content to be re-shared.

By operating in some or all of the ways described above, the facility enables document authors to flexibly and efficiently leverage existing content, including in cases in which the content continues to evolve. In addition, the facility tends to reduce requirements for computer resources—such as storage space; increase reliability—such as data integrity and security; and increase usability—such as being able to edit the complex document anywhere in the world.

In some embodiments, the facility shares content between documents stored using a construct called a "document fragment," or simply "fragment," which is a unit of document content stored separately by the facility, and easily shared between multiple documents. The document is comprised of a single "root fragment," which can directly contain content, as well as containing fragment references referring to other fragments. Those fragments referred to by the root fragment can themselves directly contain content and fragment references to other fragments, and so on. When a document is opened, the facility typically collects and synthesizes its contents by retrieving the root fragment, retrieving other fragments referred to by fragment references in the root fragment, retrieving further fragments referred to by fragment references in those fragments, and so on. In some embodiments, any fragment can be treated as a document, in the sense that it can be opened by an editing or presentation application as the root fragment. In some such embodiments, the facility annotates representations of these documents at the fragment level.

In some embodiments, the facility stores the fragments making up users' documents in a cloud-based service, where they can be accessed from virtually any location. In some embodiments, this cloud-based service uses a technique called "erasure coding" in which it decomposes, or "shreds," a fragment defined by a document author into multiple smaller constituent pieces, or "shreds," each of which the facility stores on multiple storage devices in different data centers in different geographic locations to provide disaster and outage survivability. When the cloud-based service receives a request for a fragment, it retrieves and combines these shreds to reconstitute the fragment.

In some embodiments, the facility stores a new version of a fragment to reflect each editing action performed on the fragment, each identified by the date and time at which the editing action was performed. For example, in some embodiments, the facility creates a new fragment version for each character or group of characters that is inserted in the fragment—such as by a keystroke or a text block paste—and for each character or group of characters that is deleted—such as by a backspace keypress or a select-and-delete operation. In some embodiments, each fragment version identifies the author that took the editing action reflected by the fragment version. In some embodiments, after being written, these fragment versions cannot be altered, and are said to be "immutable."

In some embodiments, over time, the facility deletes some of the versions of a fragment, so as to collapse two or more editing actions into an undeleted version of the fragment. In some embodiments, in doing so, the facility deletes only contiguous fragment versions all reflecting editing actions by the same author and immediately preceding an undeleted fragment version also reflecting an editing action by the same author.

In some embodiments, where the content is incorporated from a fragment-aware source document, the facility ensures that the incorporated content corresponds precisely to one or more whole fragments; that is, where the selected content spans only a portion of a fragment in the source document, the facility breaks that fragment in the source document into two fragments, a first that contains only the content from the original fragment that was selected, a second containing the content from the original fragment that was not selected, so that the first can be incorporated into the target document while the second is not. Where the content is incorporated from a fragment-unaware source document, the facility creates a new fragment to contain the incorporated content.

In response to the incorporation operation, the facility creates a fragment reference in the target document at the position in the target document where the content was incorporated to represent the incorporated content in the target document. In some embodiments, the fragment reference contains multiple components, such as a current fragment ID component and/or an original component. The current fragment ID component of the created fragment reference identifies the fragment to which the reference refers, such as by containing a fragment ID for this fragment that can be used to retrieve this fragment. The origin component, where used by the facility, maintains in the fragment reference state the fragment ID of the fragment in which the incorporated content originated, which can serve as a basis for changing the mode in which the incorporated content is used in the target document throughout the life of the fragment reference, and for tracking the provenance of the fragment. In some embodiments, the facility stores an ordered list of fragment IDs in the origin component to reflect the series of fragments from which the referenced fragment has been forked.

In various embodiments, at the time the user performs the incorporation operation, the user can specify an initial mode for the incorporated content in the target document by, for example, holding down a certain keyboard key during the drag interaction, using a varying control key combination to paste the incorporated content into the target document, responding to a context menu or dialog displayed by the facility in response to the incorporation operation, etc. In some embodiments, each mode has two characteristics: (1) whether the contents of the fragment are editable in the context of the incorporating document or fragment ("editable in context") and (2) how a version of the referenced fragment is chosen for inclusion in the incorporating document or fragment ("version selection"). In some embodiments, the following kinds of version selection options are available: (a) "latest"—the version of the fragment with the most recent time is incorporated by the reference; (b) "time-specified"—a particular version of the fragment associated with a particular time is incorporated by the reference (e.g., in some embodiments, an arbitrarily specified time causes selection of the fragment version whose time is the latest among the fragments that are not later than the specified time); (c) "special"—special rules are used to specify which version of the fragment is selected for incorporation. Examples of special rules are the latest document approved by a qualified approval authority, or the earliest version embodying an edit by a particular author.

In various embodiments, the facility supports some or all of the following incorporation modes: live mode, follow mode, forkable mode, pinned mode, special forkable mode, and special follow mode.

Live mode (1) is editable in context and (2) uses "latest" version selection. Thus, in live mode, an author can change the content of the fragment, which results in a new version of the fragment being created to reflect each such change. These changes will appear in any other containing fragments that incorporate the same fragment, and whose version selection option ends up selecting this version, either (a) latest, or (b) special with a selection rule that selects this version. Live mode is typically used for a reference included to both revise the referenced fragment, and reflect the revisions of others. By virtue of using the latest version selection option, a reference in live mode incorporates the latest version of the fragment, no matter its content or which authors' revision it reflects. Where live mode is selected, the facility populates a current fragment ID component of the fragment reference with the same fragment ID as the origin component. The current component of the fragment reference identifies the fragment whose contents are to be retrieved for inclusion in the target document.

Follow mode (1) is not editable in context, and (2) uses latest version selection. In follow mode, the latest version of the fragment is always incorporated, but can't be edited in the context of the document or fragment containing the follow mode reference. Follow mode is typically used to incorporated dynamic content maintained by one or more other authors, in a centralized manner.

Forkable mode (1) is editable in context, and (2) uses time-specified version selection. In forkable mode, the fragment can be edited in the context of the reference from the fragment's state at the specified time. Performing such an edit transforms the reference from forkable mode to live mode; reflects the edit in the first version of a new fragment ID; stores the new fragment ID in the context of the reference; and stores the original fragment ID in the reference's origin component. Forkable mode is typically used where a particular state of a fragment is to be the basis for a new set of edits that won't affect documents or fragments incorporating the original fragment. Similarly, the forkable and resulting live reference aren't affected by edits to the original fragment subsequent to the forkable reference version selection time.

Pinned mode (1) is not editable in context, and (2) uses time-specified version selection. While the fragment reference is in pinned mode, the version of the content incorporated in the referring document cannot be changed, either by a user editing the document or fragment containing the pinned reference (because not editable in context precludes editing by such an author), or by a user editing the fragment in the context of a different containing document or fragment (because such edits will be reflected in a new version of the fragment, which will not be selected by the time-specified selection logic of this reference). Where pinned mode is selected, the facility populates the current component of the fragment reference with the fragment ID of the origin fragment. Pinned mode is typically used to preserve a particular state of the fragment in the referring document.

Special forkable mode (1) is editable in context, and (2) specifies a special version selection rule. The incorporated fragment will, at any given time, show the content of the version of the source fragment that is selected by the special version selection rule at the time. When an author edits the fragment in context, the forking process described above occurs. Special forkable mode can be used, for example, to use an evolving template whose edits are subject to periodic approval as a basis for creating instances of new content.

Special follow mode (1) is not editable in context, and (2) specifies a special version selection rule. Thus, a special follow reference shows the version of the fragment that satisfies the version selection rule at any given time, which is not editable in context. This mode can be used, for example, to pull into a document or fragment centrally-authored content that is periodically rereleased by its authors to reflect all edits occurring since the last release.

Subject to approval-getting rules defined for the incorporated content, the user may at any subsequent time change the mode of the incorporated content via various user interface techniques, such as by right-clicking on the incorporated content and selecting an item from a resulting context menu, selecting incorporated content and choosing a menu-bar menu item, interacting with a specialized control that is displayed when the mouse cursor hovers over the incorporated content, etc. In some embodiments, the facility incorporates or interoperates with a system of authority and access controls and other content governance measures limit the actions that can be taken by a particular user with respect to a particular document or fragment in various circumstances, including changing the mode of an existing fragment reference.

FIG. 1 is a network diagram showing the environment in which the facility operates in some embodiments. The network diagram shows clients 110 each being used by a different user. Each of the clients executes software enabling its user to create, revise, and present electronic documents. Software on the client also enables the client to retrieve and synthesize remotely-stored document contents, including document fragments. In particular, the Internet 120 or one or more other networks connect each of the clients to a number of different data centers, e.g., data centers 131, 141, and 151, which in some embodiments are distributed geographically to provide disaster and outage survivability, both in terms of data integrity and in terms of continuous availability. Distributing the data centers geographically also helps to minimize communications latency with clients in various geographic locations. Each of the data centers contain servers, e.g. servers 132, 142, and 152. The servers access storage devices containing document contents, including document fragments, and execute software for responding to requests from clients and other servers to store and retrieve document contents, again including document fragments. In various embodiments, the facility uses various different distributions of responsibility for retrieving and combining document fragments between the clients and the servers.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different devices may be used as clients, including desktop computer systems, laptop computer systems, automobile computer systems, tablet computer systems, smart phones, personal digital assistants, televisions, cameras, etc.

Figure 2:
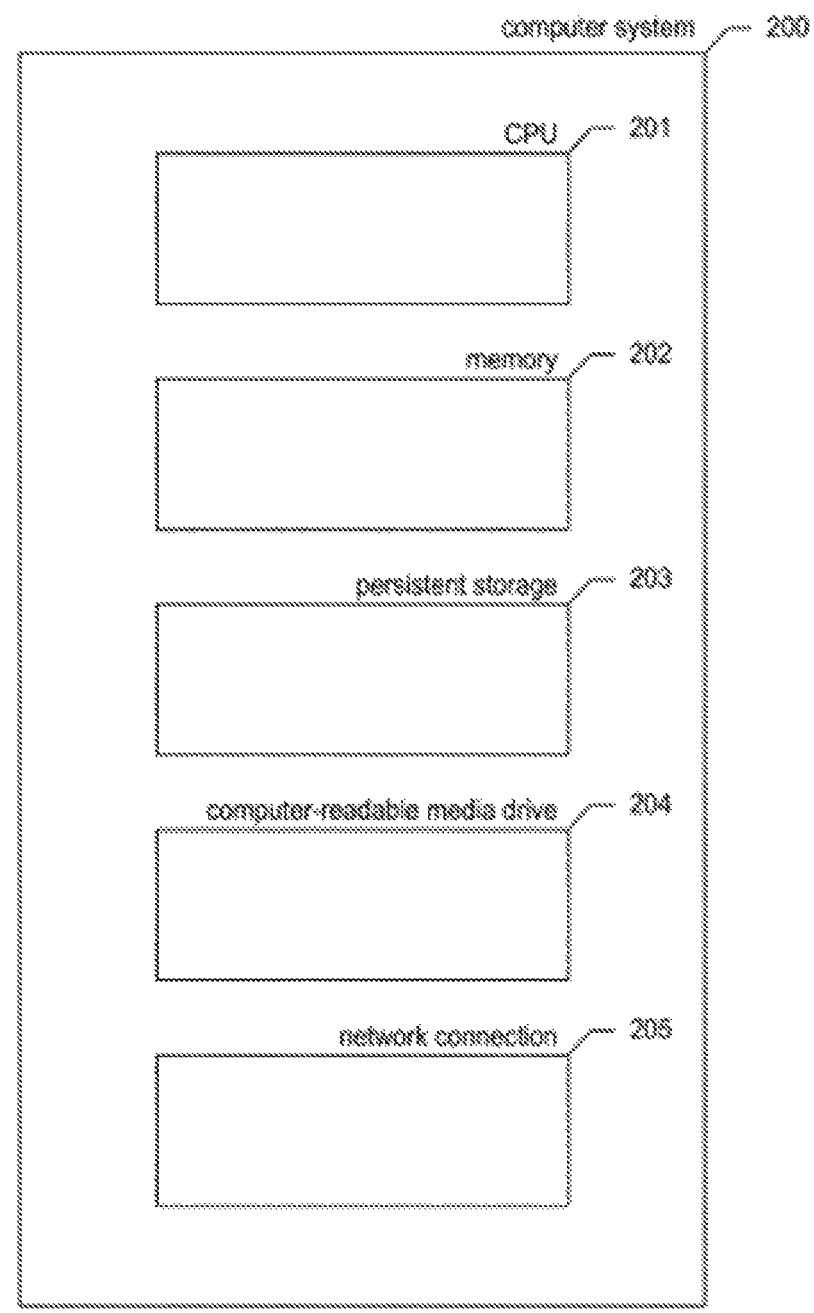
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 3:
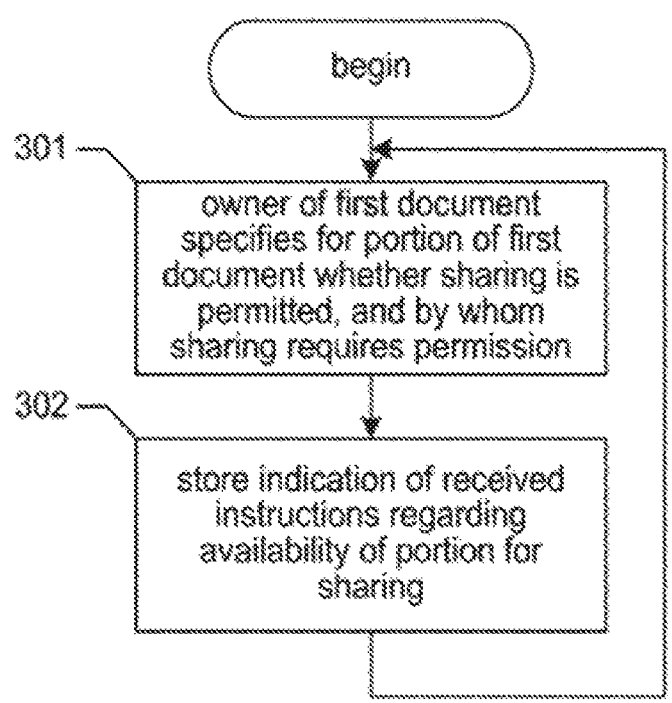
FIG. 3 is a flow diagram showing a process performed by the facility in some embodiments to designate portions of a document as available for sharing.

FIG. 3 is a flow diagram showing a process performed by the facility in some embodiments to designate portions of a document as available for sharing. In act 301, the facility enables the owner of a first document to specify for a portion of the first document selected by the owner whether sharing of this portion is permitted, and by whom sharing of this portion requires permission. The interaction of act 301 is discussed further below in connection with FIG. 4. In act 302, the facility stores an indication of the instructions received in act 301 regarding the availability of the portion for sharing. After act 301, the facility continues at act 301 to receive additional input from the owner of the first document.

Figure 4:
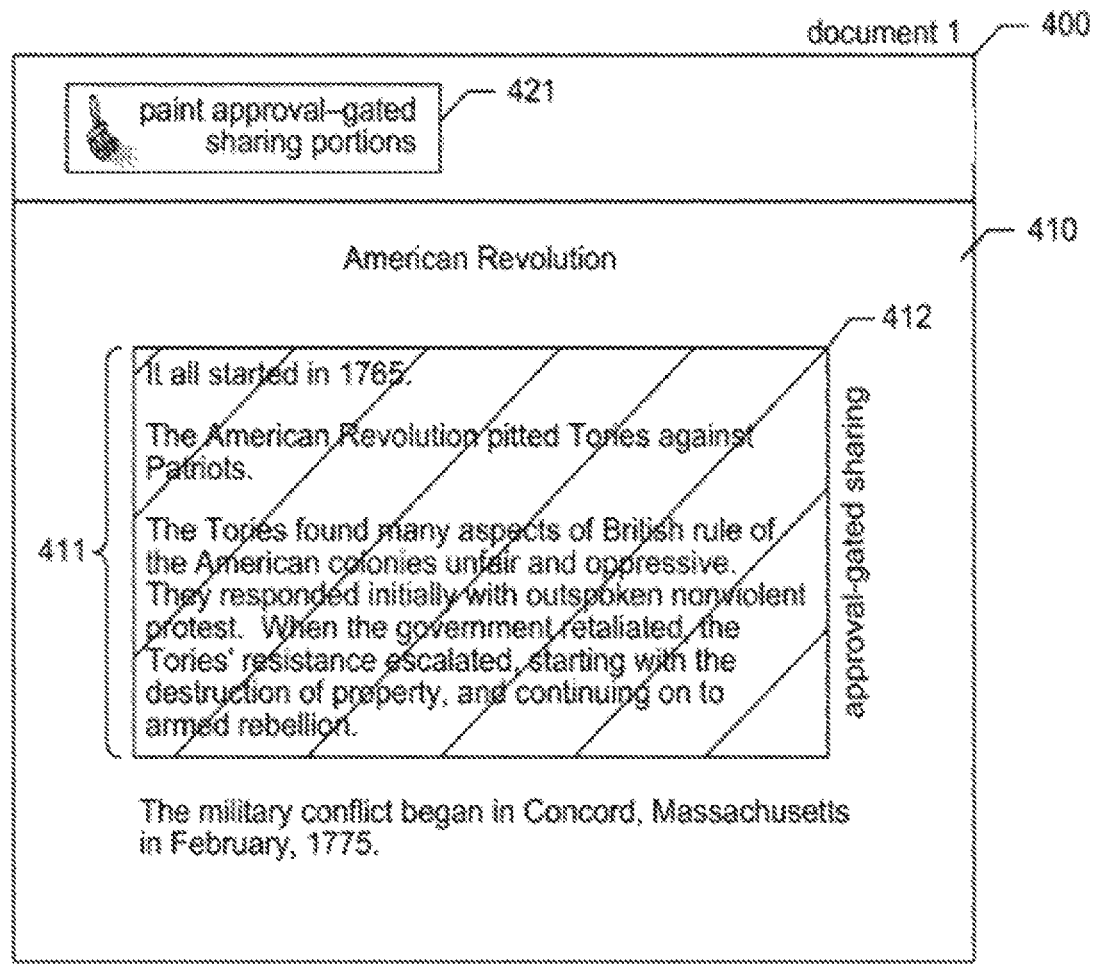
FIG. 4 is a display diagram showing a sample display presented by the facility in some embodiments in order to enable the owner of a document to designate a portion of the document as available for sharing.

FIG. 4 is a display diagram showing a sample display presented by the facility in some embodiments in order to enable the owner of a document to designate a portion of the document as available for sharing. The display shows a window 400 in which the contents 410 of "document 1" are displayed. In order to select a portion 411 of this first document as available for sharing, the owner of the first document selects control 421, then selects portion 411 of the first document, such as by dragging the mouse cursor from its upper-left hand corner to its lower-right hand corner, touching each of the three paragraphs in portion 411 with a touch input stylus, dragging the user's finger through the height of this portion, etc. In response, the facility displays a visual indication 412 that this portion 411 of the first document is available for approval-gated sharing. In some embodiments (not shown), the facility interacts with the user further in order to obtain additional related information, such as by which users approval is needed, via which approval mechanisms approval can be provided, in what editing modes incorporating users and their documents can receive revisions to incorporated portions of the first document, etc.

Figure 5:
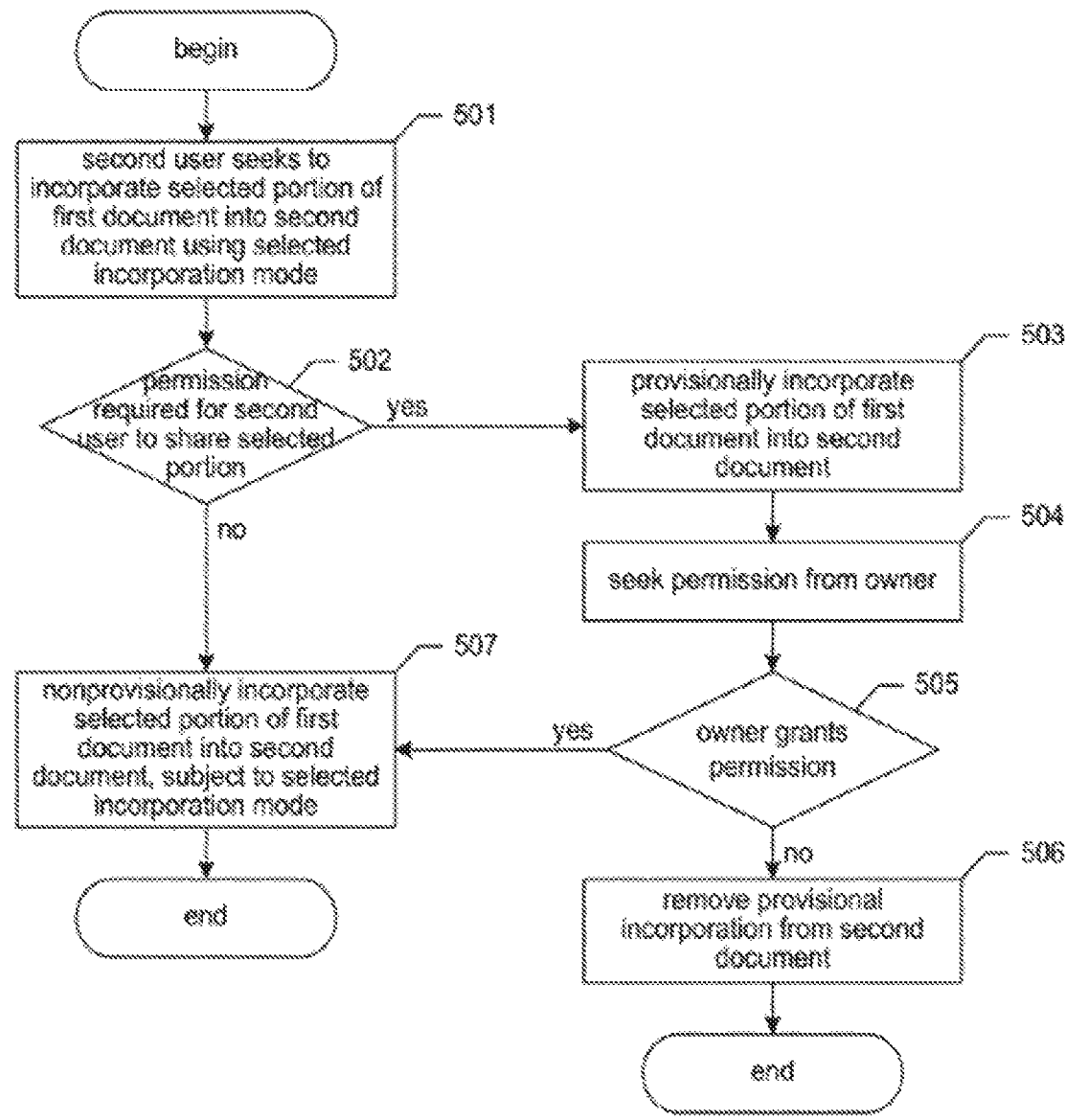
FIG. 5 is a flow diagram showing a process performed by the facility in some embodiments when a user preparing or revising a target document seeks to incorporate a portion of a source document into the target document.

FIG. 5 is a flow diagram showing a process performed by the facility in some embodiments when a user preparing or revising a target document seeks to incorporate a portion of a source document into the target document. In act 501, the second user seeks to incorporate a selected portion of the first document into a second document using an incorporation mode selected by the second user. Additional details regarding these incorporation modes is discussed below in connection with FIG. 6. In act 502, if the owner of the second document has specified that permission is required in order for the second user to incorporate the portion of the first document that the second user has selected, then the facility continues in act 503, else the facility continues in act 507. In act 503, the facility provisionally incorporates the selected portion of the first document into the second document.

Figure 6:
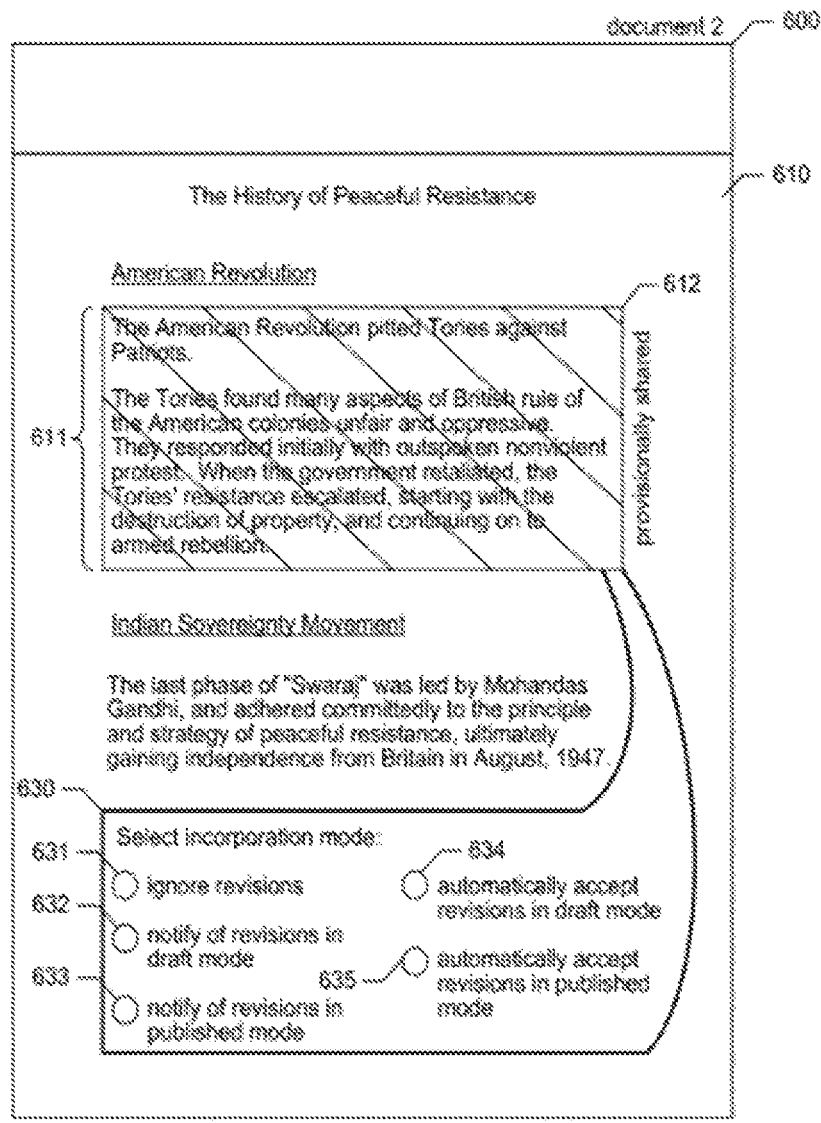
FIG. 6 is a display diagram showing a sample display presented by the facility in some embodiments in connection with the second user's incorporation of a portion of the source document into the target document.

FIG. 6 is a display diagram showing a sample display presented by the facility in some embodiments in connection with the second user's incorporation of a portion of the source document into the target document. The display shows a window 600 in which the contents 610 of "document 2"—the second document—are displayed. The user performs interactions for incorporating portion 611 of the first document into the second document, such as copying and pasting this selected portion, dragging it, etc. In some embodiments, the ability of the second user to access the first document and/or perform the incorporation interactions is controlled based on the second user's identity by a separate user privilege mechanism, in a manner orthogonal to the sharing approval-gating discussed herein. In response to the incorporation interactions, the facility displays the selected portion 611 along with a visual indication 612 that this content has been provisionally shared on a different document. The facility also displays control 630 to enable the second user to choose the incorporation mode used to incorporate the selected portion of the first document into the second document; that is, to specify the way in which revisions to this portion of the first document are to be applied to the version of it appearing in the second document. Control 630 includes a radio button 631 that the user may select in order to choose an incorporation mode in which the version of the selected portion of the first document appearing in the second document never changes; a radio button 632 that the user may select to choose an incorporation mode in which, each time an author performs revisions to the selected portion in the context of another document, such as the first document, in a "draft" revision mode that has not yet been finalized or published, the second user is notified and can determine whether to accept the revisions; a radio button 633 that the user can select to choose an incorporation mode in which the second user is notified by revisions to the selected portion that reach a "published" revision mode and can decide whether to apply the revisions within the context of the second document; a radio button 634 that the user may select to choose an incorporation mode in which all revisions performed in the draft mode are automatically accepted and applied in the context of the second document; and a radio button 635 that the user may select in order to choose an incorporation mode in which all revisions that reach the published revision mode are automatically accepted and applied.

Returning to FIG. 5, in act 504, the facility seeks permission for the sharing sought by the second user from the owner of the first document.

Figure 7:
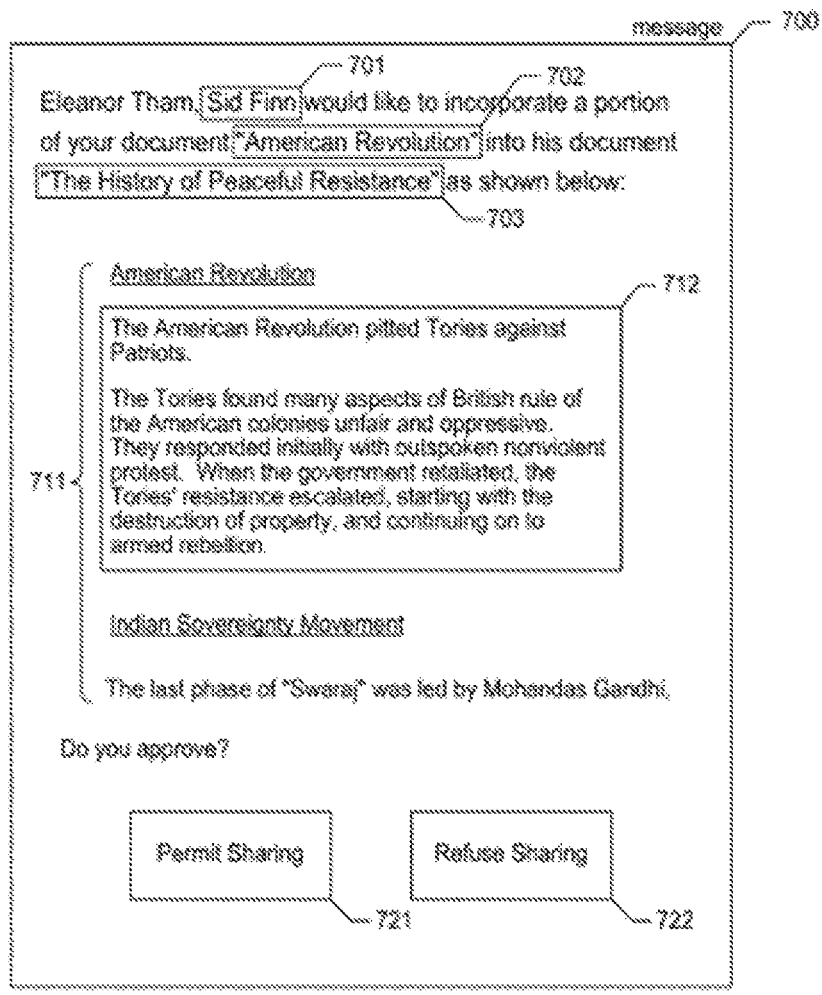
FIG. 7 is a display diagram showing a sample display presented by the facility in some embodiments to seek sharing permission from the owner of the first document.

FIG. 7 is a display diagram showing a sample display presented by the facility in some embodiments to seek sharing permission from the owner of the first document. The display shows a message 700, such as an email message, a text message, an app notification, etc., in which the facility seeks permission from the owner of the first document. The message identifies the incorporating author 701, the source document 702 from which content is to be shared, and the target document 703 into which the shared content is to be incorporated. In some embodiments, the user can select any of information items 701-703 to display additional information about them, such as by hovering a mouse cursor over them, touching them, right-clicking on them, etc. The message further includes a contextual snippet 711 of the target document, including the portion of the source document 712 that is to be incorporated. In some embodiments, a visual indication such as a rectangle around a selected portion identifies it explicitly to the owner of the source document. In some embodiments (not shown), the message includes an indication of the incorporation mode selected by the second user. In some embodiments (not shown), the message includes a mechanism for the second user to interact directly with the first user, such as to discuss the proposed incorporation. The message further includes control 721 that the owner can select in order to permit the proposed incorporation, as well as control 722 that the user can select in order to prohibit the proposed incorporation.

Returning to FIG. 5, in act 505, if the owner grants permission, such as by selecting control 721 shown in FIG. 7, then the facility continues in act 507, else the facility continues in act 506. In act 506, the facility removes from the second document the provisional incorporation of the selected portion. After act 506, these acts conclude. In act 507, the facility non-provisionally incorporates the selected portion of the first document into the second document. This non-provisional incorporation is subject to the incorporation mode selected by the second user. In some embodiments (not shown), the facility provides one or more mechanisms for the second user to later adjust the incorporation mode selected for this incorporation. After act 507, these acts conclude.

Figure 8:
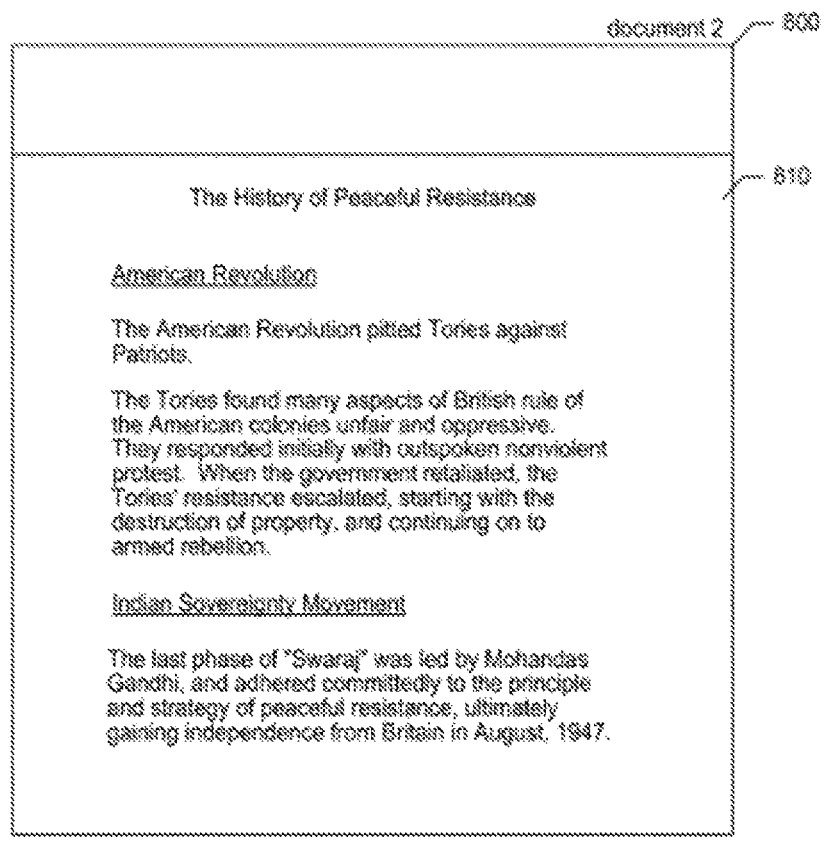
FIG. 8 is a display diagram showing a sample display presented by the facility in some embodiments to show the non-provisional incorporation that occurs in act 507 shown in FIG. 5.

FIG. 8 is a display diagram showing a sample display presented by the facility in some embodiments to show the non-provisional incorporation that occurs in act 507 shown in FIG. 5. The display includes a window 800 in which the contents 810 of the second document are shown. It can be seen that portion 611 shown in FIG. 6 remains in the second document, without the visual indication 612 that it is provisionally incorporated. In some embodiments (not shown), at this point, the facility displays a visual indication that the portion is non-provisionally incorporated from a different document. In various such embodiments, the user can interact with his visual indication to display more information about the incorporation, such as when it was performed, information about the source document including a link to the source document, etc.

Figure 9:
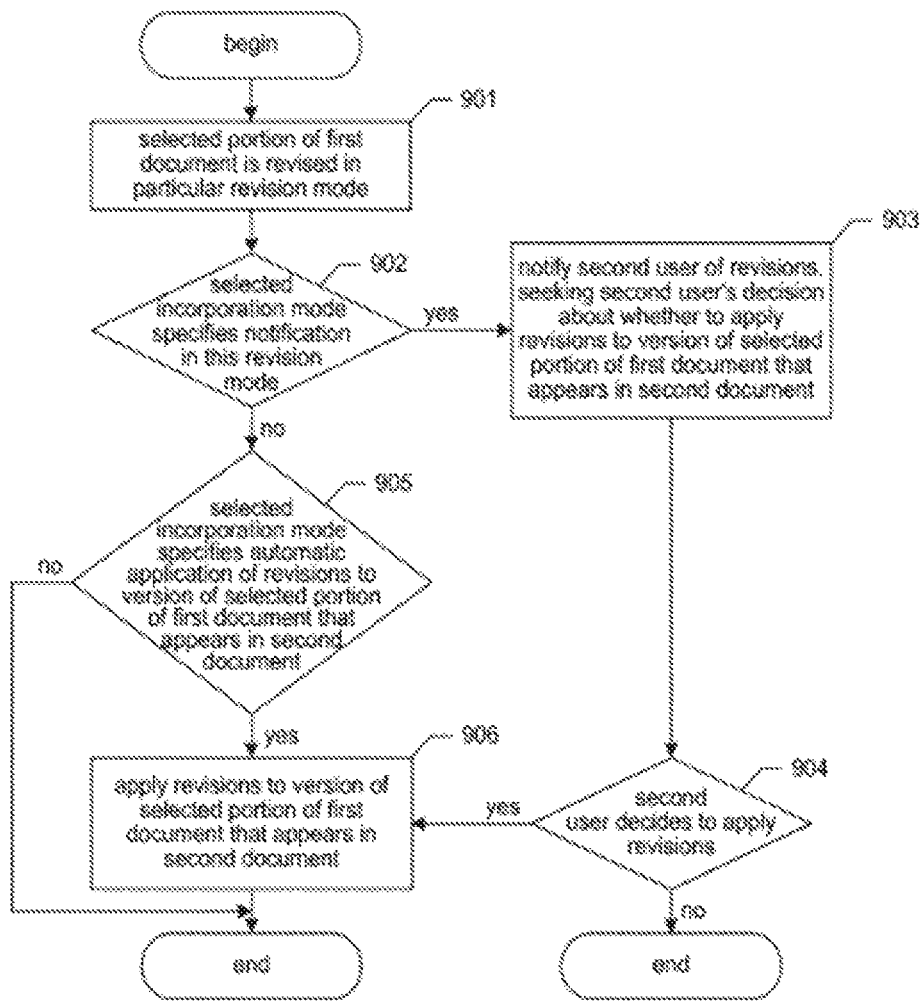
FIG. 9 is a flow diagram showing a process performed by the facility in some embodiments in order to respond to revision of a source document.

FIG. 9 is a flow diagram showing a process typically performed by the facility in some embodiments in order to respond to revision of a source document. In act 901, the facility determines that the selected portion of the first document has been revised in a particular revision mode, such as draft, approval, published, etc.

Figure 10:
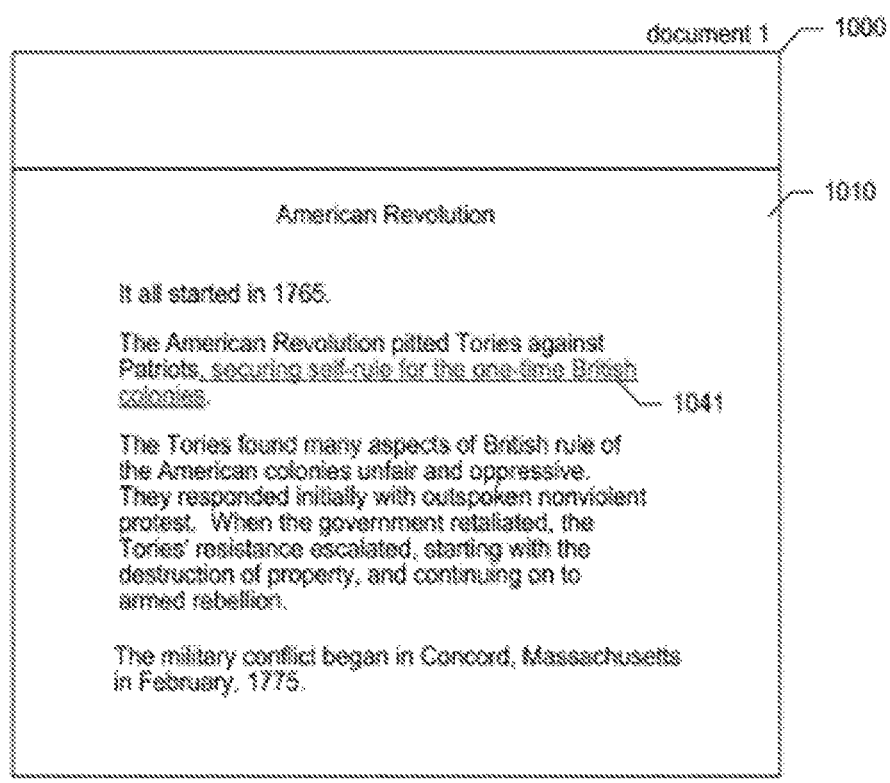
FIG. 10 is a display diagram showing a sample display presented by the facility in some embodiments in order to show revisions to a source document.

FIG. 10 is a display diagram showing a sample display presented by the facility in some embodiments in order to show revisions to a source document. The display shows window 1000, containing the contents 1010 of the first document. It can be seen from annotation 1041 that a revision has occurred that has added text to the second paragraph of the first document.

Returning to FIG. 9, in act 902, if the incorporation mode selected by the second user—such as in control 630 shown in FIG. 6—specifies that the second user be notified about revisions occurring in the revision mode corresponding to the revisions detecting in act 901, then the facility continues in act 903, else the facility continues in act 905. In act 903, the facility notifies the second user of the revisions detected in act 901, seeking the second user's decision about whether to apply these revisions to the version of the selected portion of the first document that appears in the second document.

Figure 11:
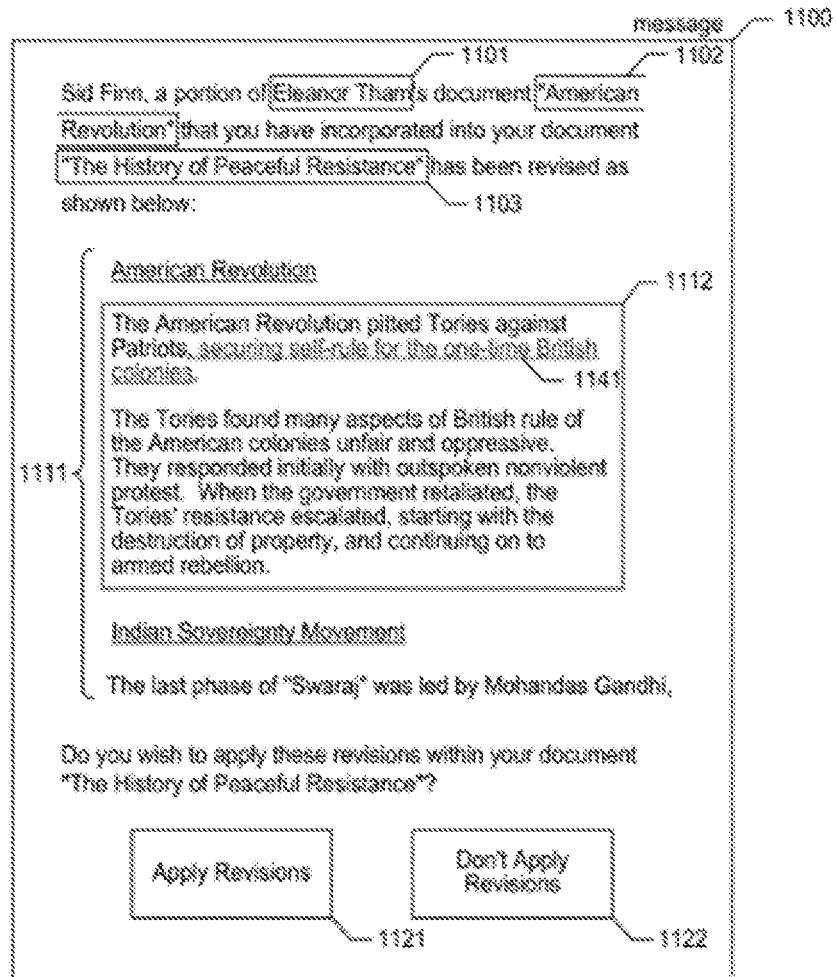
FIG. 11 is a display diagram showing a sample display presented by the facility in some embodiments in order to notify the second user of revisions to the source document and seeking the second user's decision about whether to apply them to the target document.

FIG. 11 is a display diagram showing a sample display presented by the facility in some embodiments in order to notify the second user of revisions to the source document and seeking the second user's decision about whether to apply them to the target document. The display includes a message 1100 delivered to the second user. The message includes the identity 1101 of the owner of the source document; the name 1102 of the source document, and the name 1103 of the target document. In some embodiments, the user can select any of information items 1101-1103 to display additional information about them, such as by hovering a mouse cursor over them, touching them, right-clicking on them, etc. The message also contains a contextual snippet 1111 of the target document, including the portion 1112 incorporated from the first document, which shows in any suitable manner the revisions 1141 that have been performed to this portion of the first document. The message further includes a control 1121 that the second user can select in order to apply these revisions within the context of the second document, as well as a control 1122 that the second user can select in order to omit to apply these revisions in the context of the second document.

Returning to FIG. 9, in act 904, if the second user decides to apply the revisions in the context of the second document, then the facility continues in act 906, else these acts conclude.

In act 905, if the incorporation mode selected by the second user specifies automatic application of revisions, then the facility continues in act 906, else these acts conclude. In act 906, the facility applies the revisions to the version of the selected portion of the first document that appears in the second document. After act 906, these acts conclude.

Figure 12:
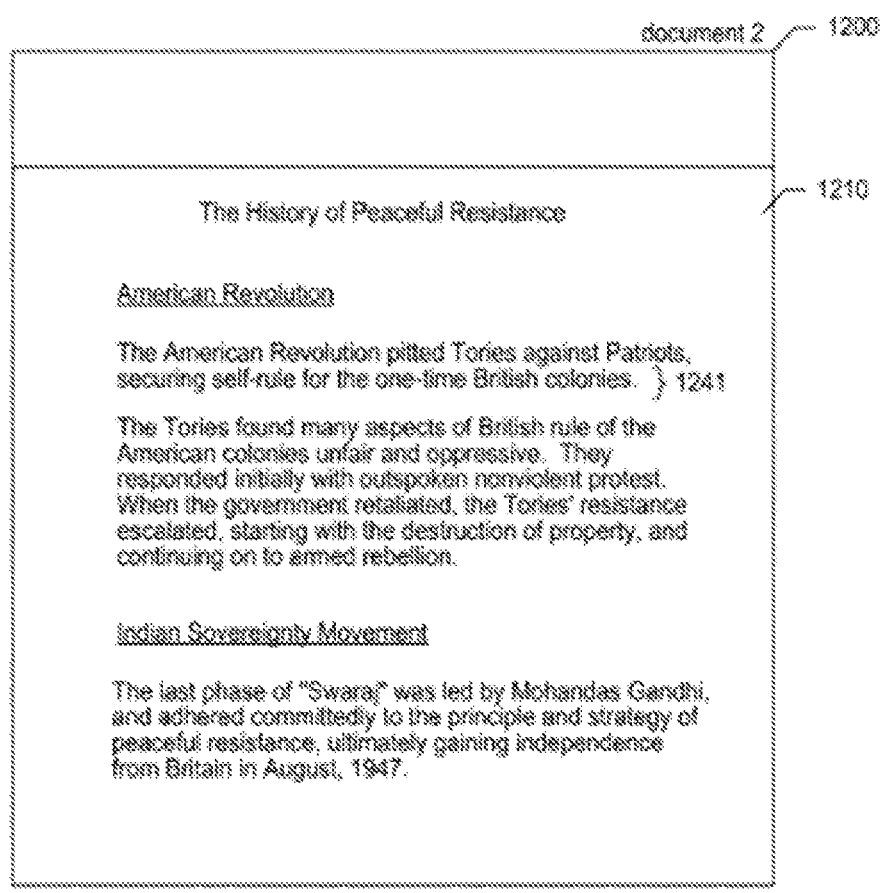
FIG. 12 is a display diagram showing a sample display presented by the facility in some embodiments to show the application of revisions in the context of a target document.

FIG. 12 is a display diagram showing a sample display presented by the facility in some embodiments to show the application of revisions 1241 in the context of a target document. The display includes window 1200 containing the contents 1210 of the second document after revisions 1241 to the first document have been applied to the second document, such as in response to an explicit decision by the second user in act 904 shown in FIG. 9, or in response to the second user's selection of an incorporation mode in which revisions 1241 are automatically applied in certain revision modes.

In some embodiments, the facility provides a method in a computing system, comprising: receiving from a user input selecting a portion of the document; receiving from the user input designating the selected document portion as being subject to approval-gated sharing; and persistently storing an indication that the selected document portion is subject to approval-gated sharing.

In some embodiments, the facility provides a computer-readable medium having contents configured to cause a computing system to: receive from a user input selecting a portion of the document; receive from the user input designating the selected document portion as being subject to approval-gated sharing; and persistently store an indication that the selected document portion is subject to approval-gated sharing.

In some embodiments, the facility provides a method in a computing system, comprising: receiving selection of a draft mode with respect to a portion of the document; after selection of the draft mode, receiving input specifying revisions to the portion of the document; in response to receiving the input specifying revisions, notifying a first user of the revisions; after notifying the first user, receive selection of a published mode for the portion of the document; and in response to selection of the published mode, notifying a second user of the revisions for the first time.

In some embodiments, the facility provides a computer-readable medium having contents configured to cause a computing system to: receive selection of a draft mode with respect to a portion of the document; after selection of the draft mode, receive input specifying revisions to the portion of the document; in response to receiving the input specifying revisions, notify a first user of the revisions; after notifying the first user, receive selection of a published mode for the portion of the document; and in response to selection of the published mode, notify a second user of the revisions for the first time.

In some embodiments, the facility provides a computing system, comprising: a processor; and a memory having contents that, when executed by the processor: in response to input from the user, incorporate a portion of the first document into a second document; receive from the user input selecting one of a plurality of change notification options to apply to the portion of the first document in connection with its incorporation into the second document, the change notification options comprising (1) receiving notification of editing changes to the portion of the first document, (2) receiving notification of published changes to the portion of the first document, and (3) receiving no notifications about changes to the portion of the first document; and provide, in connection with the second document, notifications to the user for changes to the portion of the first document in accordance with the selected change notification option.

In some embodiments, the facility provides a method in a computing system, comprising: in response to input from the user, incorporating a portion of the first document into a second document; receiving from the user input selecting one of a plurality of change notification options to apply to the portion of the first document in connection with its incorporation into the second document, the change notification options comprising (1) receiving notification of editing changes to the portion of the first document, (2) receiving notification of published changes to the portion of the first document, and (3) receiving no notifications about changes to the portion of the first document; and providing, in connection with the second document, notifications to the user for changes to the portion of the first document in accordance with the selected change notification option.

In some embodiments, the facility provides a computer-readable medium having contents configured to cause a computing system to: in response to input from the user, incorporate a portion of the first document into a second document; receive from the user input selecting one of a plurality of change notification options to apply to the portion of the first document in connection with its incorporation into the second document, the change notification options comprising (1) receiving notification of editing changes to the portion of the first document, (2) receiving notification of published changes to the portion of the first document, and (3) receiving no notifications about changes to the portion of the first document; and provide, in connection with the second document, notifications to the user for changes to the portion of the first document in accordance with the selected change notification option.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system, comprising:
receiving, from a first user, a selection of a portion of an electronic document, the first user being an owner of the electronic document;
receiving, from the first user, a designation of the selected electronic document portion as being subject to approval-gated sharing, wherein the approval-gated sharing specifies whether approval is needed for incorporation of the selected electronic document portion into other electronic documents;
receiving, from the first user, a sharing parameter for the selected electronic document portion, the sharing parameter including a set of users requiring approval to incorporate the selected electronic document portion into another electronic document;
receiving, from the first user, an identification of a second user authorized to approve sharing requests for the selected electronic document portion;
persistently storing in a storage device an indication that the selected electronic document portion is subject to approval-gated sharing, an indication of the sharing parameter, and an indication of the second user;
receiving input from a requesting user, the requesting user being from the set of users requiring approval, to incorporate at least a subset of the selected electronic document portion into a separate electronic document;
in response to the input from the requesting user, presenting a request to approve incorporation of the subset of the selected electronic document portion into the separate electronic document, the request presented to at least one of the owner of the electronic document and the second user associated with the subset of the selected electronic document portion,
wherein presenting the request includes identifying the requesting user, identifying the separate electronic document, presenting an indication of an incorporation mode selected by the requesting user, and presenting a preview of the incorporation of the subset of the selected electronic document portion requested by the requesting user,
wherein the preview includes a quotation of the subset of the selected electronic document portion shown incorporated in the separate electronic document pursuant to the incorporation of the subset of the selected electronic document portion requested by the requesting user; and receiving, from at least one of the owner of the electronic document and the second user, approval of the request.

2. The method of claim 1, wherein receiving the designation of the selected electronic document portion includes receiving a selection of an approval-gated sharing visual control and receiving a highlighting of the selected electronic document portion after selection of the approval-gated sharing visual control.

3. The method of claim 1, further comprising: receiving, from the first user, a specification of a plurality of different revision modes for revising the selected electronic document portion.

4. The method of claim 1, further comprising: receiving, from the first user, a criteria for automatically approving sharing requests for the selected electronic document portion.

5. The method of claim 1, further comprising: in response to receiving the designation of the selected electronic document portion being subject to approval-gated sharing, displaying a visual indication that the selected electronic document portion is subject to approval-gated sharing, wherein the visual indication visually distinguishes the selected electronic document portion from other electronic document portions of the electronic document.

6. The method of claim 1, further comprising: receiving a second sharing parameter for the selected electronic document portion, the second sharing parameter including an indication of whether the selected electronic document portion is eligible for re-sharing between multiple additional users and at least one re-sharing requirement for re-sharing between multiple additional users.

7. A computing system, comprising:
a processor; and
a memory having contents that, when executed by the processor:
receive, from a first user, a selection of a portion of an electronic document, the first user being an owner of the electronic document;
receive, from the first user, a designation of the selected electronic document portion as being subject to approval-gated sharing, wherein the approval-gated sharing specifies whether approval is needed for incorporation of the selected electronic document portion into other electronic documents;
receive, from the first user, a sharing parameter for the selected electronic document portion, the sharing parameter including a mechanism for providing approval, wherein the mechanism for providing approval is selected from a group consisting of email message, text message, and application notification;
receive, from the first user, an identification of a second user authorized to approve sharing requests for the selected electronic document portion;
persistently store in a storage device an indication that the selected electronic document portion is subject to approval-gated sharing, an indication of the sharing parameter, and an indication of the second user;
receiving input from a requesting user, the requesting user being from the set of users requiring approval, to incorporate at least a subset of the selected electronic document portion into a separate electronic document;
in response to the input from the requesting user, presenting a request to approve incorporation of the subset of the selected electronic document portion into the separate electronic document via the mechanism for providing approval,
the request presented to at least one of the owner of the electronic document and the second user associated with the subset of the selected electronic document portion,
wherein presenting the request includes identifying the requesting user, identifying the separate electronic document, presenting an indication of an incorporation mode selected by the requesting user, and presenting a preview of the incorporation of the subset of the selected electronic document portion requested by the requesting user, wherein the preview includes a quotation of the subset of the selected electronic document portion shown incorporated in the separate electronic document pursuant to the incorporation of the subset of the selected electronic document portion requested by the requesting user; and
receiving, from at least one of the owner of the electronic document and the second user, approval of the request.

8. A non-transitory computer-readable medium having contents configured to cause a computing system to:
receive, from a first user, a selection of a portion of an electronic document, the first user being an owner of the electronic document;
receive, from the first user, a designation of the selected electronic document portion as being subject to approval-gated sharing, wherein the approval-gated sharing specifies whether approval is needed for incorporation of the selected electronic document portion into other electronic documents;
receive, from the first user, a sharing parameter for the selected electronic document portion, the sharing parameter including an approved editing mode usable by an incorporating user when making a revision to the selected electronic document portion;
receive, from the first user, an identification of a second user authorized to approve sharing requests for the selected electronic document portion; and
persistently store in a storage device an indication that the selected electronic document portion is subject to approval-gated sharing, an indication of the sharing parameter, and an indication of the second user;
receiving input from a requesting user, the requesting user being from the set of users requiring approval, to incorporate at least a subset of the selected electronic document portion into a separate electronic document;
in response to the input from the requesting user, presenting a request to approve incorporation of the subset of the selected electronic document portion into the separate electronic document, the request presented to at least the owner of the electronic document and the second user associated with the subset of the selected electronic document portion,
wherein presenting the request includes identifying the requesting user, identifying the separate electronic document, presenting an indication of an incorporation mode selected by the requesting user, and presenting a preview of the incorporation of the subset of the selected electronic document portion requested by the requesting user, wherein the preview includes a quotation of the subset of the selected electronic document portion shown incorporated in the separate electronic document pursuant to the incorporation of the subset of the selected electronic document portion requested by the requesting user; and receiving, from at least one of the owner of the electronic document and the second user, approval of the request.

9. The method of claim 1, wherein the incorporation mode includes the requesting user specifying how a revision made to the selected electronic document portion affects the incorporation of the subset of the selected electronic document portion in the separate electronic document.

10. The computing system of claim 7, wherein the incorporation mode includes the requesting user specifying how a revision made to the selected electronic document portion affects the incorporation of the subset of the selected electronic document portion in the separate electronic document.

11. The non-transitory computer-readable medium of claim 8, wherein the incorporation mode includes the requesting user specifying how a revision made to the selected electronic document portion affects the incorporation of the subset of the selected electronic document portion in the separate electronic document.

\* \* \* \* \*